(12) United States Patent
Natanzon et al.

(10) Patent No.: US 10,922,281 B2
(45) Date of Patent: Feb. 16, 2021

(54) APPLICATION AWARE DEDUPLICATION

(71) Applicant: EMC IP Holding Company LLC, Hopkinton, MA (US)

(72) Inventors: Assaf Natanzon, Tel Aviv (IL); Amihai Savir, Sansana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 187 days.

(21) Appl. No.: 16/170,784

(22) Filed: Oct. 25, 2018

(65) Prior Publication Data

US 2020/0134050 A1    Apr. 30, 2020

(51) Int. Cl.
*G06F 16/174*    (2019.01)

(52) U.S. Cl.
CPC ...... *G06F 16/1752* (2019.01); *G06F 16/1744* (2019.01)

(58) Field of Classification Search
CPC . G06Q 10/107; G06F 11/1451; G06F 16/182; G06F 11/1453; G06F 16/1752; G16B 50/00
See application file for complete search history.

(56) References Cited

U.S. PATENT DOCUMENTS

| | | | | |
|---|---|---|---|---|
| 7,562,110 B2* | 7/2009 | Miloushev | ........... | G06F 16/1824 709/201 |
| 9,141,633 B1* | 9/2015 | Li | ........................ | G06F 16/1752 |
| 2005/0219075 A1* | 10/2005 | Storer | ...................... | H03M 7/30 341/51 |
| 2010/0161608 A1 | 6/2010 | Jain et al. | | |
| 2010/0250501 A1 | 9/2010 | Mandagere et al. | | |
| 2013/0060739 A1* | 3/2013 | Kalach | ................ | G06F 16/1752 707/692 |
| 2013/0138620 A1 | 5/2013 | Yakushev et al. | | |
| 2013/0144840 A1* | 6/2013 | Anglin | ................ | G06F 11/1453 707/640 |
| 2014/0164561 A1* | 6/2014 | Chai | ........................ | H04L 69/04 709/217 |
| 2014/0337295 A1* | 11/2014 | Haselton | ............. | G06F 11/1453 707/646 |
| 2015/0350133 A1* | 12/2015 | Murphy | ............... | G06Q 10/107 709/203 |
| 2016/0196218 A1* | 7/2016 | Kumar | ................ | G06F 11/1448 713/193 |
| 2017/0154153 A1* | 6/2017 | Nagahara | ............... | G16B 50/00 |
| 2017/0235756 A1* | 8/2017 | Mehta | ................. | G06F 11/1451 707/620 |
| 2017/0344560 A1* | 11/2017 | Talur | ..................... | G06F 16/182 |
| 2018/0113876 A1* | 4/2018 | Akelbein | ............ | G06F 16/1756 |

OTHER PUBLICATIONS

International Search Report for PCT/US2019/044336 and dated Sep. 18, 2019.

* cited by examiner

*Primary Examiner* — Etienne P Leroux

(74) *Attorney, Agent, or Firm* — Workman Nydegger

(57) ABSTRACT

Deduplication of files or other data or objects in a manner that is aware of a format of the file and the application. A file may be chunked based on the format. The chunks are more consistent and lead to higher deduplication ratios. The file may be presented as a single file. However, the file is stored in chunks or subfiles and deduplication is performed with respect to the chunks. When the file is read, the file is rebuilt from its respective chunks. The files may also be compressed using differential compression, which leverages the content of similar files to compress a current file.

20 Claims, 4 Drawing Sheets

APPLICATION AWARE DEDUPLICATION

FIELD OF THE INVENTION

Embodiments of the present invention relate to data protection operations. More particularly, embodiments of the invention relate to systems, apparatus, and methods for application aware deduplication.

BACKGROUND

Deduplication operations attempt to reduce the amount of data stored in a storage system. For example, if the same object is stored twice in a storage system, this data can be deduplicated by removing one of the objects. Of course, any necessary references to that object are retained or created so that the object can be properly restored or accessed. For example, an index or map can be maintained that maps the remaining or deduplicated object to all of the applications or backups that require the object. When the object is part of the file, a map or index of all files that include that object may be maintained.

One of the problems in deduplication is achieving good de-duplication ratios. The difficulty in having or increasing deduplication ratios has many sources. For example, compression and/or encryption contributes to the difficulty in achieving good deduplication ratios at least because these same objects, when compressed and/or encrypted, appear very different from their uncompressed and/or decrypted form and do not deduplicate well even though they have a lot of the same content. Further, two objects that have small differences when uncompressed may have large differences when compressed.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
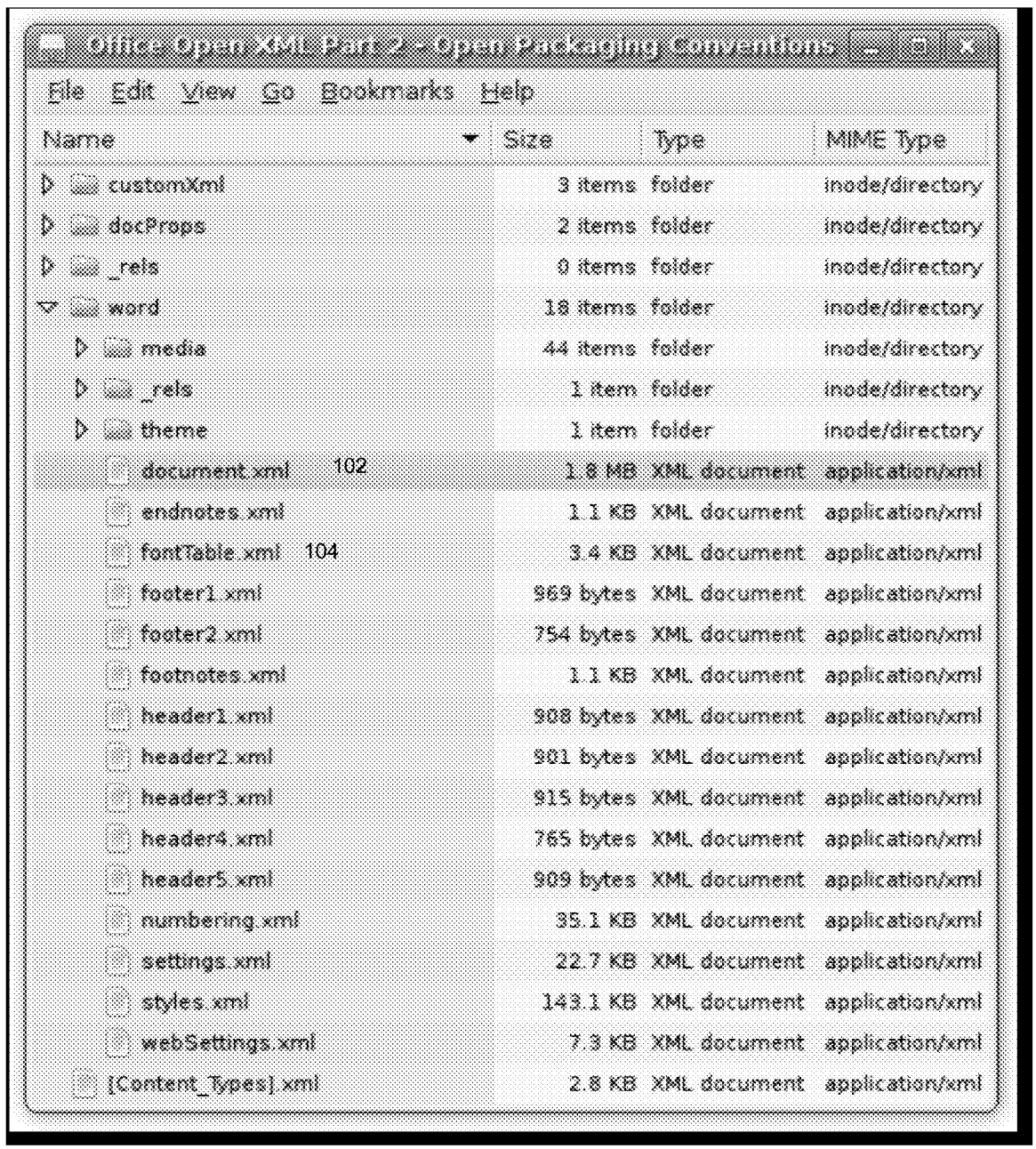
FIG. 1 is an example of a file whose format includes subfiles and that is associated with an application.

Embodiments of the invention relate to systems. apparatus, and methods for storing data in storage systems including, but not limited to, file based storage systems, object based storage systems, or the like. Storage operations performed in storage systems may include, but are not limited to, deduplication operations, application aware deduplication operations, compression operations, reconstitution operations (generating an original file from deduplicated and/or chunked portions of the file) or the like or combination thereof. Embodiments of the invention further relate to data protection operations and to systems, methods, and apparatus for performing data protection operations and/or storage operations. Data protection operations include, but are not limited to, deduplication operations, including application aware deduplication operation, backup operations, restore operations, or the like or combination thereof. Storage operations and/or data protection operations may include other related operations such as chunking operations, encryption/decryption operations, hashing operations, indexing operations, and the like.

Embodiments of the invention improve the ability of file systems (e.g., Data Domain FS) to leverage multiple techniques and achieve high deduplication ratios. Embodiments of the invention are discussed in terms of files, but embodiments of the invention can be applied to objects and other data or data formats. For example, a file (or an object or other data) may be deduplicated by cutting the file at specific locations. Dividing or cutting a file or object into portions or pieces is an example of chunking a file. The chunk sizes may be different or may be the same and may depend on how the file is chunked. In one example and without limitation, the size of the chunks may be on the order of 20 KB to 30 KB. The size of the chunks may be balanced with the amount of metadata associated with deduplicated chunks. Chunk sizes that are too small may be associated with too much metadata. Chunk sizes that are too large do not deduplicate well. Further, the chunk size can be tuned and may depend on the file being chunked.

Some applications (e.g., word processing application, presentation applications) store files using specific formats. For example, Microsoft Word® (an example of an application) may store documents in a format that is represented by a .docx extension. Thus, word processing documents may be stored in accordance with a particular format.

In one example, a document format may include multiple files. In particular, the document format may be embodied as a ZIP file that stores smaller XML (eXtensible Markup Language) files as well as media files such as JPEG and AVI files. For convenience and clarity, embodiments of the invention, including file formats, are discussed using the term file to refer to the file as a whole (e.g., the ZIP file). The files contained within the file (e.g., the XML files) are referred to herein as subfiles. Thus, the document format essentially includes a container or package (the file such as a ZIP file) that contains smaller subfiles. The format of the file may be specific to the application. For example, a document format may differ from a presentation format or a spreadsheet format. Embodiments of the invention may also apply to other applications and their associated file types. When deduplicating these types of files, the format of the file is taken into account by the file system or by the data protection system.

Embodiments of the invention may also account for the manner in which the file is compressed. For example, the file may be compressed (and/or encrypted) as a whole. Alternatively, each of the subfiles may be compressed separately. In one example, the whole file is then compressed—achieving dual level compression. Further, the deduplication amount or the deduplication ratio of uncompressed files compared to the deduplication ratio of compressed separate files may be different. A small change in a non-compressed file results in a completely different compressed file and this factor may impact deduplication ratios.

More generally, a deduplication system typically deduplicates each file separately or independently by chunking the file and looking for identical chunks in the system (e.g., looking at chunks coming from all applications or data sources in the system). Embodiments of the invention further chunk the file in a manner that accounts for the format. By accounting for the file format, deduplication ratios can be improved.

For example, chunking a file in a manner that accounts for the format and/or the content may allow an image contained in the file to be chunked consistently. If the file were chunked without regard to the format, the chunk including the image may also include other content such as text. As a result, the image may not deduplicate well even if that same image is included in other files. When the format is taken into account, the image can be chunked by itself. This allows the image to be deduplicated more effectively and results in improved deduplication ratios.

In some examples, deduplication is performed on uncompressed files. More specifically, because small changes to a file can result in a compressed file that is very different from the uncompressed file, decompressing the file prior to deduplication allows those portions of the file that are common to other files to be deduplicated more effectively. By deduplicating with respect to the uncompressed files, higher deduplication ratios may be achieved.

In one example, the storage operation (or a data protection operation) may start a deduplication operation by cutting or chunking a file. The file may be cut at locations that correspond the locations where the subfiles end/begin. It may not be necessary to separate all of the subfiles into chunks. Rather, some of the chunks may include multiple subfiles. For example, media files included in a particular format may be cut or chunked separately as they typically remain unchanged. Images can also be deduplicated effectively when compressed because the same compression is typically applied.

During operation of the deduplication file system, a file may be presented to a user or on a client as a single file (e.g., a docx file). Internally, however, the deduplication file system may operate or perform deduplication on a decompressed file and may work on each subfile separately. This allows higher deduplication ratios to be achieved. Further, the various subfiles may be stored separately in the deduplicated storage. The subfiles may be stored in a compressed form or an uncompressed form. Thus, when the file is accessed or read, the deduplication file system will rebuild the file in its original format by gathering the subfiles. When rebuilding the file from the subfiles, the subfiles and/or file is compressed/uncompressed as necessary.

In addition, it may be possible to leverage differential compression. For files that are similar (e.g., have the same name and/or similar content), the deduplication file system can use differential compression for files for which the deduplication was low, but there are subfiles in the previous version of the document with similar properties.

Embodiments of the invention provide a system where files are presented to a client as whole files even though, in the file system storage, the files are stored as chunks. The chunks may be stored in a compressed form or an uncompressed form. In addition to deduplication, embodiments of the invention may also employ differential compression. In this example, the files may be stored in a compressed state in order to take advantage of the differential compression.

FIG. 1 illustrates an example of a file (a document in this example) that includes multiple subfiles. From the user's perspective, the document may correspond to a single file 100. FIG. 1 illustrates the file 100 in an expanded (e.g., unzipped) state to illustrate that the file includes subfiles such as subfile 102. By treating these subfiles independently or as small groups, the deduplication and/or compression of the file can be improved. For example, in a given document, the text may change from one version to the next. However, portions of the file 100 may not change. The subfile 104 (or other subfile) may not change. By chunking the file 100 based on locations of the subfiles, the file 100 can be deduplicated more efficiently. Further, similar files may be compressed with higher compression ratios. Both deduplication and differential compression can conserver storage space.

Figure 2:
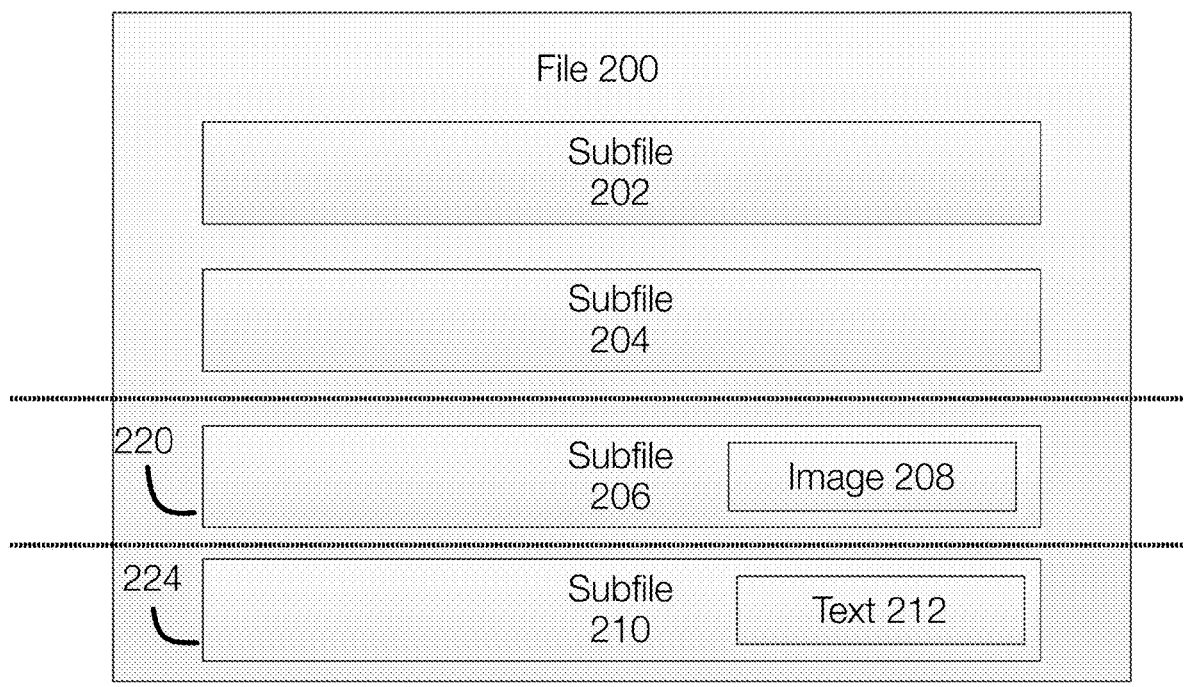
FIG. 2 illustrates another example of a file format where the larger file or container includes subfiles.

This is further illustrated in FIG. 2, which illustrates an example of a file that is chunked into portions based, in part, on where the corresponding subfiles start/end. FIG. 2 illustrates a file 200 that includes subfiles 202, 204, 206 and 210. The subfile 208 may contain an image 208 and the subfile 210 may include text 212. The subfiles 202 and 204 may contain other information related to the file 200 such as a header, styles, properties, etc.

FIG. 2 illustrates that the file 200 is chunked, by way of example only, into three chunks. The file 200 is cut at position 214 and position 216. The position 214 is between the end of subfile 204 and the beginning of subfile 206. The position 216 is between the end of subfile 206 and the beginning of subfile 210. In addition to cutting or chunking the file based on the beginning/end of the subfiles, the size of the chunk may be considered. Thus, a particular chunk may, but is not require to, include more than one subfile. If this is the case, the subfiles that may not be subject to change may be selected. In addition, the selected files may not be directly next to each other within the file 200.

Thus, the first chunk 218 includes the subfiles 202 and 204. The second chunk 220 includes the subfile 206 and the third chunk includes the subfile 210. By chunking the file in this manner, the image 208 can be chunked by itself. This ensures that the image 208 is deduplicated—even when compressed. If, for example, the chunking resulted in a chunk that included the image 208 and some text, any change to the text would reduce the deduplication efficiency. The text 212 may also be part of the subfile 210. In one example, the text 212 may change a lot or a little with regard to the text of other files. However, deduplication can be effective at least because the other subfiles may not change and may be deduplicated.

Figure 3:
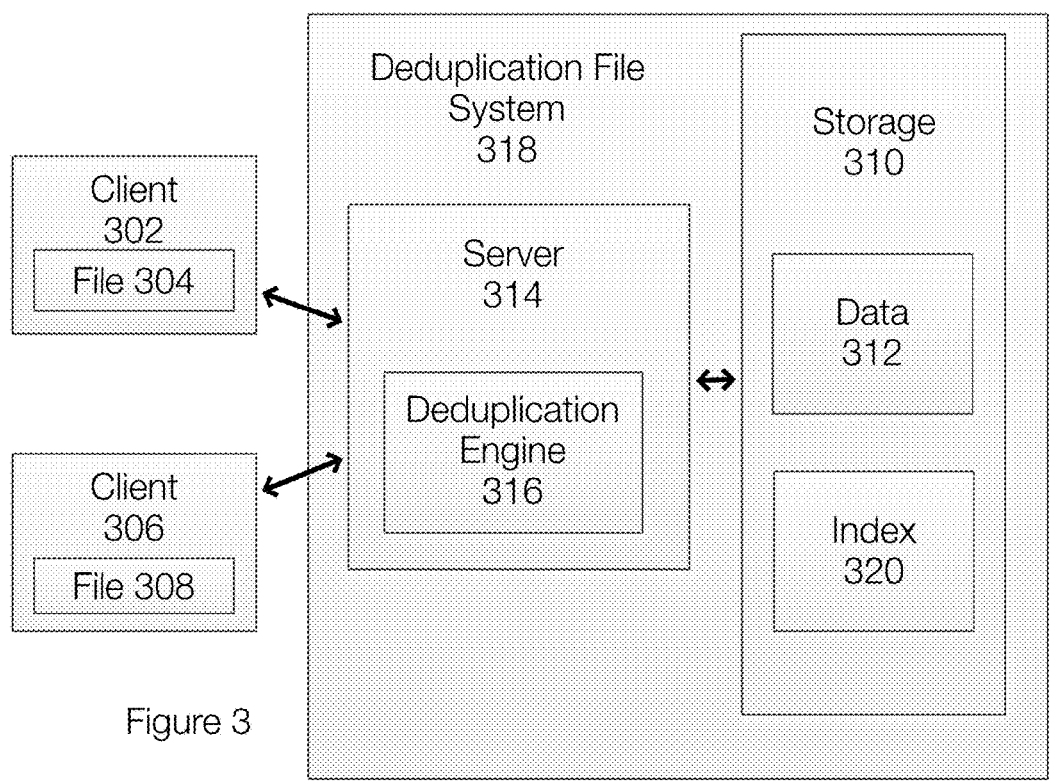
FIG. 3 illustrates an example of an application aware deduplication file system that is configured to deduplicate files.

FIG. 3 illustrates an example of a deduplicated file system. The system shown in FIG. 3 may also represent a backup or data protection system. FIG. 3 illustrates a client 302 that is using a file 304 and a client 306 that is using a file 308. A server 314 may be included as part of a deduplication file system 318. The server 314 is associated with a deduplication engine 316. The deduplication file system 318 may also be associated with storage 310 that stores data 312. The data 312 represents files stored by the deduplication file system 318. The data 312 may be deduplicated at least partially and/or compressed.

When the client 302 saves the file 304, the deduplication engine 316 may deduplicate the file 304 when storing the file 304 in the data 312 of the storage 310. When an application running on the client (and/or on the server 314) presents the file 304, the file 304 may be presented as a single file. In one example, the file 304 is a single file at least from the perspective of the client 302 and/or the corresponding application, which understands the format. When storing the file 304, the deduplication engine 316 may determine the format of the file 304. The deduplication engine 316 may then unzip the file 304 and decompress the file 304 such that the subfiles can be identified and such that the deduplication engine 316 can work with uncompressed subfiles. The file 304, in a decompressed state, may then be chunked as previously discussed. In some examples, the file 304 can be chunked when in a compressed state because the format of the file is known. For example, each subfile may be compressed independently. This allows the file to be chunked when compressed.

After the file is chunked and decompressed, the deduplication engine 316 can then work on each chunk or each subfile in order to deduplicate the file 304 or deduplicate the subfiles with respect to the data 312. In one example, the deduplication engine 316 may operate on each subfile as a separate entity.

Once deduplicated, metadata may be stored relative to the deduplicated subfiles (or other chunks) and chunks or subfiles of the file 304 that were not found in the data 312 may be added to the data 312 (after the deduplication the subfile can also be compressed by the storage system). At the same time, the server 314 (or the deduplication engine 316) may also store metadata that allows the file to be rebuilt or reconstituted when read and presented to the client 302 or for other reasons. When storing the deduplicated file 304, compression may be employed.

In one example, the deduplication of the subfiles may be performed using hash values or other identifiers. When the data is stored in a compressed form, the deduplication can be performed using these identifiers. After deduplication, the subfile can also be compressed by the system.

FIG. 3 further illustrates that embodiments of the invention perform deduplication in a manner that presents the file 304 as a whole to the client 302 (or user) while maintaining the file in chunks in the storage 310. The chunks may be compressed or uncompressed in the storage 310. The file 304 is deduplicated from the perspective of the subfiles. The deduplication file system 318 may maintain an index 320. The index 320 can be used to identify the subfiles corresponding to the file 304 or to the file 308. Thus, if the client 302 requests the file 304, the index 304 may be used to locate all of the file's subfiles. This allows the file 304 to be reconstituted and returned to the client 302. If necessary, the subfiles are placed into the format associated with the application requesting the file 304. Thus, the subfiles may be zipped or otherwise processed according to the relevant format.

Figure 4:
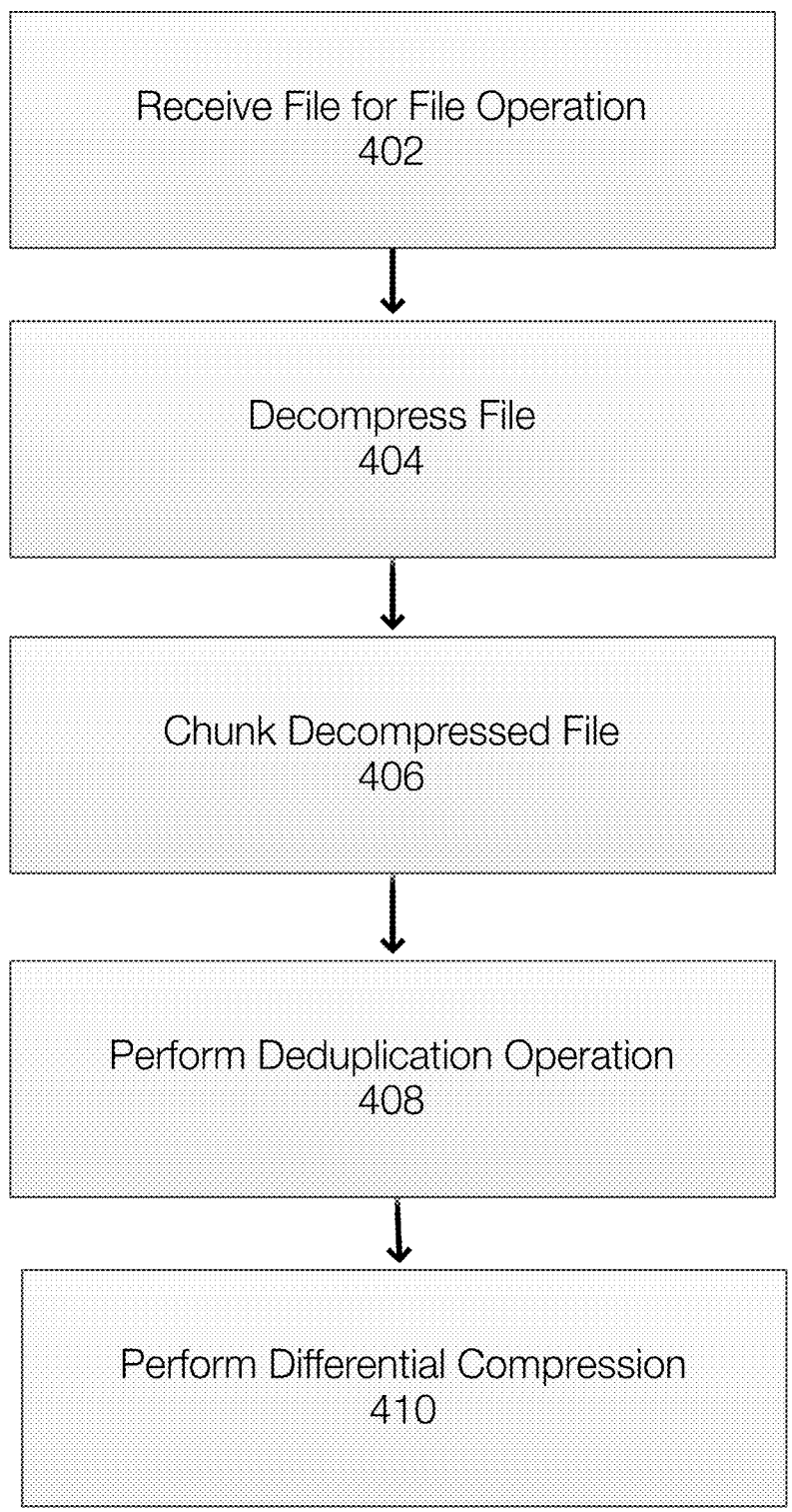
FIG. 4 is an example of a method for application aware file deduplication.

FIG. 4 illustrates an example of a method for performing a storage system operation or a file system operation or a data protection operation. In FIG. 4, a file may be received 404 at a file system (or at a backup server or a file system server). The file received by the file system may be associated with an application and may have a particular format. The file system can ascertain the format of the file in preparation for deduplication.

In one example, the deduplication file system may decompress 404 the file. Decompressing the file allows the file system to identify the subfiles. As previously stated, however, it may be possible to identify the subfiles while the file is compressed. Thus, once the file is decompressed (if necessary), the decompressed file is chunked 406 or divided into chunks or parts or pieces. In one example each chunk contains one or more subfiles. For deduplication purposes, each subfile can be treated independently for deduplication and the deduplication operation is performed 408.

Deduplication may involve, for each chunk, determining whether the chunk already exists in the file system. This can be achieved by generating a hash of each chunk and comparing the hash of the chunk with hashes of chunks already stored. A match indicates that the chunk is already present while a mismatch indicates that the chunk should be added to the file system.

An index may be used to map the subfiles of the file to the file. The index thus allows the various subfiles to be retrieved and reconstituted when the file is read or otherwise used by a client. Each chunk stored in the storage system may map to multiple files.

In one example, differential compression may also be used. In one example, differential compression may be used for files in which the de-duplication ratio is low, but where previous versions of the file or files with similar properties. In one example, differential compression allows involves compression using the similarities between two files.

Figure 5:
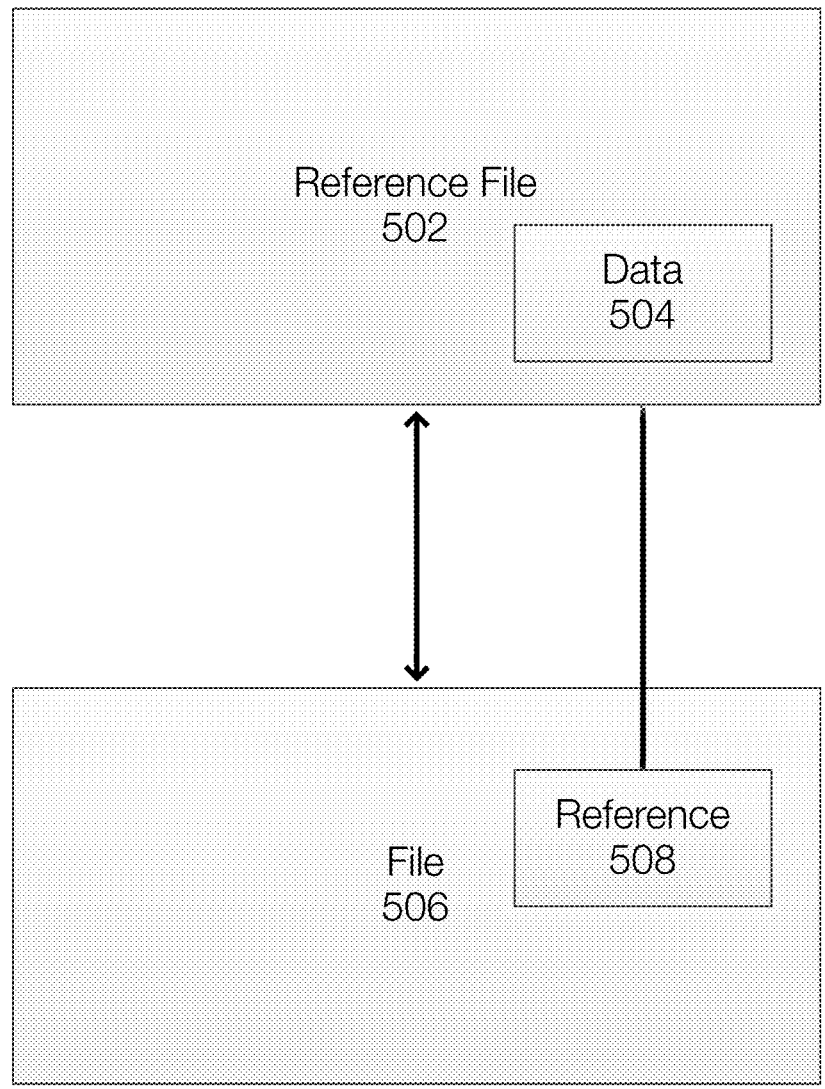
FIG. 5 illustrates an example of differential compression.

FIG. 5 illustrates an example of differential compression. In one example, the data is maintained in a compressed form, but is separated into portions or chucks. The compression of the file 506 is then performed with reference to the reference file 502. When the file 506 is compressed, a reference 508 may point to data 504 in the reference file. In this example, the reference 508 corresponds to the data 504. When restoring or reconstituting the file 506, the necessary data 504 is retrieved from the reference file 502. When decompressing the file 506, the reference file 502 is also decompressed.

In other words, differential compression can be used to compress a file using similarities between two files. For example, files with the same name or stored in the same location or the like may be sufficiently similar. For example, a presentation file may be changed by adding a slide. The new document has substantially similarity to the previous version. Using the previous version as a reference file, much of the new version can be replaced with pointers or references. This results in high compression ratios.

In another example, a particular file may not deduplicate well because of small changes. However, the two files can be evaluated differently for compression purposes so that references to a reference file can be used in place of the data. This allows the file to be compressed more effectively. In one example, these files may still be chunked. However, the compression may be able to compare smaller portions of data inside the chunks. This allows higher compression ratios even if the files do not deduplicate due to small changes.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing deduplication in a file system, the method comprising:
    receiving a file from a client to store in a storage of a file system, wherein the file has a format associated with an application;
    determining the format of the file, wherein the file includes subfiles;
    chunking the file based on the format of the file, wherein at least one of the chunks corresponds to more than one of the subfiles of the file; and
    deduplicating the chunks with respect to other chunks stored in the storage.

2. The method of claim 1, further comprising chunking the file at locations that correspond to ends/beginnings of the subfiles.

3. The method of claim 1, further comprising presenting the file as a single file to the client and storing the file as chunks in the storage.

4. The method of claim 3, wherein the chunks are stored in a compressed form.

5. The method of claim 3, wherein the chunks are stored in an uncompressed form.

6. The method of claim 1, further comprising rebuilding the file when the file is read from chunks corresponding to the file in the storage.

7. The method of claim 1, further comprising performing differential compression on the file by compressing the file with respect to a reference file that has similar properties.

8. The method of claim 1, further comprising decompressing the file before chunking the file.

9. A non-transitory computer readable medium comprising instructions that, when executed, perform the method of claim 1.

10. An appliance configured to perform deduplication on files, the appliance comprising:
    a storage; and
    a deduplication engine comprising a processor, wherein the deduplication engine is configured to:
    receive a file from a client to store in the storage of the appliance, wherein the file has a format associated with an application;
    determine the format of the file, wherein the file includes subfiles;
    chunk the file based on the format of the file, wherein at least one of the chunks corresponds to more than one subfiles of the file; and
    deduplicate the chunks with respect to other chunks stored in the storage.

11. The appliance of claim 10, wherein the deduplication engine is configured to chunk the file at locations that correspond to ends/beginnings of the subfiles.

12. The appliance of claim 10, wherein the deduplication engine is configured to present the file as a single file to the client and store the file as chunks in the storage.

13. The appliance of claim 10, wherein the deduplication engine is configured to store the chunks in a compressed form and/or in an uncompressed form.

14. The appliance of claim 10, wherein the deduplication engine is configured to rebuild the file when the file is read by reading chunks corresponding to the file in the storage, wherein the chunks are identified from an index maintained by the deduplication engine.

15. The appliance of claim 10, wherein the deduplication engine is configured to perform differential compression on the file by compressing the file with respect to a reference file that has similar properties.

16. The appliance of claim 10, wherein the deduplication engine is configured to decompress the file before chunking the file.

17. The appliance of claim 15, wherein the file, when differentially compressed, includes references to a reference file, wherein the similar properties includes at least one of a same location or a same name.

18. The appliance of claim 17, wherein the deduplication engine is configured to rebuild the differentially compressed file by decompressing the reference file and the differentially compressed file.

19. A method comprising:
receiving a file from a client to store in a storage of a file system, wherein the file has a format associated with an application;

determining the format of the file, wherein the file includes subfiles; chunking the file based on the format of the file, wherein each of the chunks correspond to one or more subfiles of the file; and deduplicating the chunks with respect to other chunks stored in the storage, differentially compressing the file with respect to a reference file that has similar properties, wherein the file, when differentially compressed, includes references to a reference file, and rebuilding the differentially compressed file by decompressing the reference file and the differentially compressed file.

20. A non-transitory computer readable medium comprising instructions that, when executed, perform the method of claim 19.

* * * * *